(12) United States Patent
Hunter

(10) Patent No.: US 7,297,235 B2
(45) Date of Patent: Nov. 20, 2007

(54) METHOD AND APPARATUS FOR MAKING MOLDED FILTER ELEMENTS

(75) Inventor: Alex George Hunter, Durham (GB)

(73) Assignee: PSI Global Ltd., Durham (GB)

( * ) Notice: Subject to any disclaimer, the term of this patent is extended or adjusted under 35 U.S.C. 154(b) by 317 days.

(21) Appl. No.: 10/701,969

(22) Filed: Nov. 5, 2003

(65) Prior Publication Data
US 2004/0145072 A1    Jul. 29, 2004

Related U.S. Application Data

(63) Continuation of application No. PCT/GB02/01304, filed on Mar. 19, 2002.

(30) Foreign Application Priority Data
May 5, 2001    (GB)    ................... 0111147.5

(51) Int. Cl.
*D21J 3/00*    (2006.01)

(52) U.S. Cl. ............... 162/387; 264/37.18; 264/40.1; 264/86; 425/217; 425/257; 162/221; 162/218; 162/227

(58) Field of Classification Search ................ 162/387; 264/37.18, 40.1, 86; 425/217, 257
See application file for complete search history.

(56) References Cited

U.S. PATENT DOCUMENTS

| | | |
|---|---|---|
| 4,116,834 A | 9/1978 | King |
| 4,238,208 A | 12/1980 | Frykhult et al. |
| 4,272,318 A | 6/1981 | Walker et al. |
| 4,303,472 A | 12/1981 | Walker et al. |
| 4,441,960 A | 4/1984 | Karnis et al. |
| 5,129,923 A | 7/1992 | Hunter et al. |
| 5,536,410 A | 7/1996 | Katsura et al. |
| 5,786,894 A * | 7/1998 | Shields et al. .............. 356/338 |
| 6,048,256 A | 4/2000 | Obeng et al. |

FOREIGN PATENT DOCUMENTS

| | | |
|---|---|---|
| DE | 3332324 | 3/1984 |
| EP | 806244 | 1/1986 |
| GB | 2018235 | 10/1979 |
| GB | 2126497 | 3/1984 |
| GB | 2161106 | 1/1986 |
| JP | 101131073 | 5/1998 |
| JP | 1135016 | 5/1999 |

OTHER PUBLICATIONS

British Search Report for Application No. GB 0111147.5, (Sep. 28, 2001),4.
British Search Report for Application No. GB 0111147.5, (Apr. 26, 2002),4.
International Search Report for PCT/GB02/01304, (Dec. 17, 2002),2.

* cited by examiner

*Primary Examiner*—Mark Halpern
(74) *Attorney, Agent, or Firm*—Schwegman, Lundberg & Woessner P.A.

(57) ABSTRACT

Apparatus for forming fibrous filter elements such as tubular elements molded from borosilicate microfibers. Molding rigs are supplied with a slurry from a system including a holding tank and a reservoir. The reservoir is coupled to a water intake and also receives recycled aqueous liquid. The holding tank receives a mixture of fibers and aqueous liquid. A controller monitors volume levels in the holding tank and reservoir and allows for incremental pH changes.

15 Claims, 3 Drawing Sheets

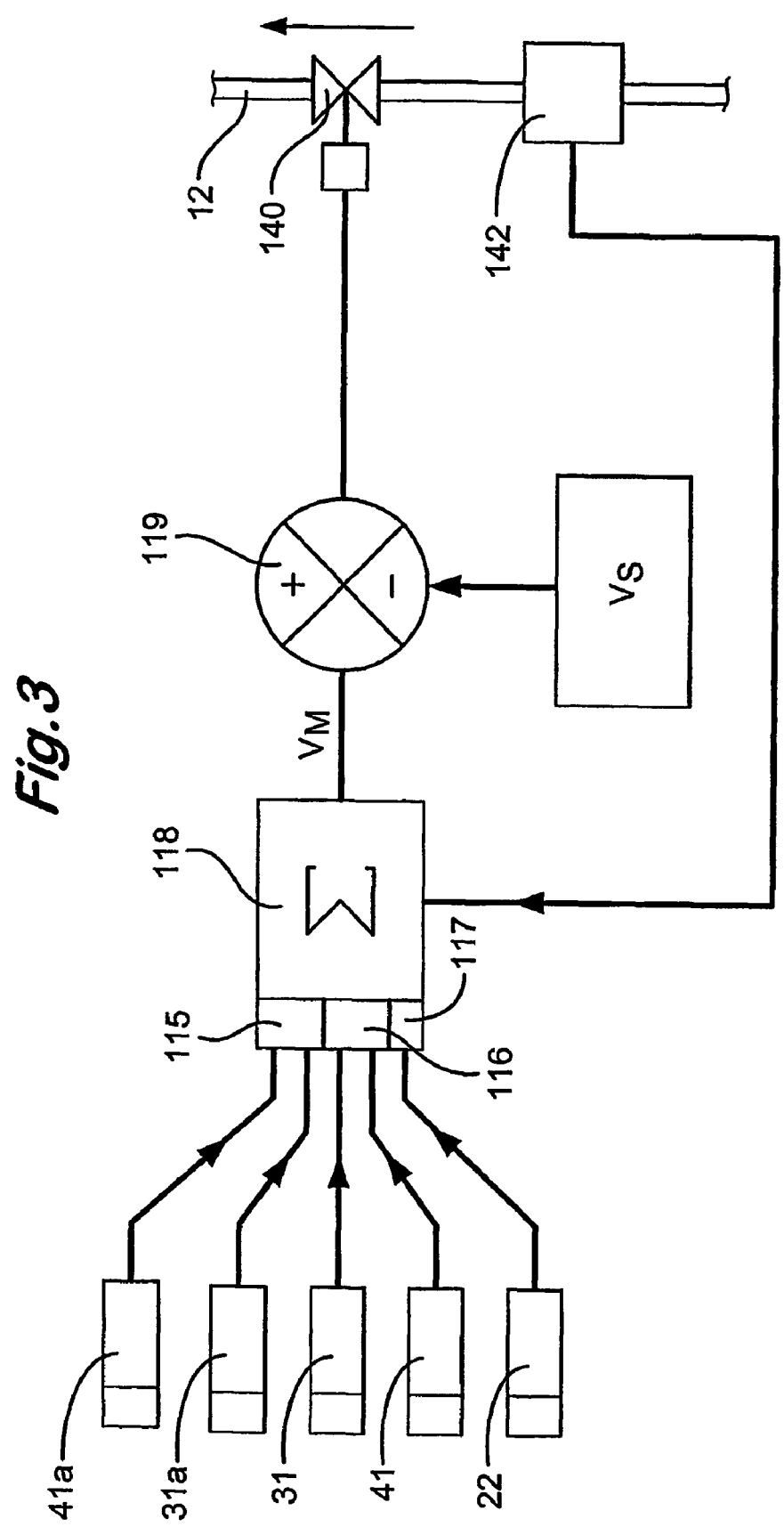

METHOD AND APPARATUS FOR MAKING MOLDED FILTER ELEMENTS

RELATED APPLICATIONS

This application is a continuation under 35 U.S.C. 111(a) of PCT/GB02/01304 filed Mar. 19, 2002 and published in English as WO 02/089954 A2 on Nov. 14, 2002, which claimed priority from GB 0111147.5 filed May 05, 2001, which applications and publication are incorporated herein by reference and made a part hereof.

FIELD OF THE INVENTION

This invention relates to a method and to an apparatus for making molded filter elements. It is particularly, but not exclusively concerned with the molding of elements of borosilicate microfibres for use e.g. in the manufacture of filters for coalescing aerosols of lubricant or liquid.

BACKGROUND TO THE INVENTION

U.S. Pat. No. 4,303,472 (the disclosure of which is incorporated herein by reference) describes and claims a method for forming a tubular filter element which includes the steps of:

(a) forming a slurry of fibers in a liquid;

(b) introducing the slurry under pressure into the top of an annular molding space defined between a central core, a vertical cylindrical screen spaced from and outward of said core and a support defining a lower boundary for the molding space so that a mass of fibers becomes compacted on the screen and liquid is discharged from the molding space through the screen;

(c) progressively increasing the height of the effective open area of the cylindrical screen by moving upwardly a sleeve in sliding contact with the cylindrical screen at a rate substantially equal to the rate at which the height of the mass of fibers increases above the support; and (d) removing the resulting tubular mass of fibers from the molding space.

In a practical embodiment, the filter element comprises a mass of borosilicate glass microfibres bounded by a foraminous outer support sheet or by foraminous inner and outer support sheets, e.g. of steel mesh with an open area of 45-70%. The borosilicate fibers are dispersed in water in a blending tank under mechanical agitation, and an acid, e.g. hydrochloric or sulfuric acid is added to give a pH of 2.9-3.1 at which the dispersion is stable, the fiber to water ratio being 0.01-0.5 wt %, typically 0.05 wt %. The resulting slurry is introduced into the molding space under a pressure of typically 414-689 mb (6-10 p.s.i). and molded as described above. The sleeve is raised progressively at substantially the same rate as that at which the height of the fiber mass increases in order to maintain a flow of the dispersion to the point where the mass of fibers is building up, after which air may be passed through the molded element to reduce the content of residual water. The formed filter element is removed from the molding space, oven dried, resin impregnated and heated to harden the resin. The resin may be e.g. a silicone or an epoxy resin and may be impregnated in a solvent such as acetone, but it is now preferred that the resin should be a phenolic resin which may be impregnated as an aqueous solution. The fibers in a finished filter element produced by the above method are predominantly layered in planes perpendicular to the direction in which the dispersion flows into the molding space, and the same packing pattern arises throughout the range of forming pressures that can be used in practice. This non-random packing pattern results in a filter element that provides efficient depth filtration and has an advantageous combination of properties including high burst strength and low pressure drop. The molded tubular elements may be bonded to end caps to complete the formation of the filter.

The above process has been used e.g. to manufacture air/oil separators designed to remove water and oil mist particles generated in screw or sliding vane compressors or in vacuum pumps where the size of the particles generated lies in the range 0.3-1.5 microns ($\mu$m) and also to manufacture in-line filters for removing oil, water and contaminants from a stream of compressed air. Filters for the above purposes are described in our U.S. Pat. No. 5,129,923 the disclosure of which are also incorporated herein by reference.

Although the process described in U.S. Pat. No. 4,303,472 has been operated for many years, there is scope for improvement particularly as regards the consistency in properties of the product produced, e.g. as regards pressure drop.

SUMMARY OF THE INVENTION

We have found that improved consistency in molding fibrous filter elements from slurry can be achieved by providing a slurry holding tank or tanks separate from a slurry mixing tank or tanks, recycling aqueous liquid from the or each molding rigs to a reservoir also fed with mains water, and controlling the total volume of water in the apparatus so that mains water need be added to the reservoir only in relatively small increments compared to the volume of aqueous liquid already in the reservoir which then contains predominantly recycled aqueous liquid of known composition or contains liquid of gradually changing composition. By having liquid in the reservoir tank whose composition is largely known or gradually changing, abrupt changes in composition of the liquid in the mixing tank or tanks is avoided and instability and over-shoot in systems for controlling the composition of liquid in the mixing tank or tanks can be avoided. Furthermore mixing can be continued until it has been determined that a freshly made slurry mix is of the correct consistency and free of fiber aggregates before the slurry is allowed to enter the holding tank or tanks and to be supplied to the molding rig or rigs.

We have also found that control of the properties of the slurry mix to ensure that the mix is correct prior to progression to the molding stage contributes significantly to the consistency of the resulting product, especially where each filter carries a traceable mark by which it can be related back to the process conditions employed in its manufacture which can be measured and recorded in real time, which facilitates investigation of any deviation from a desired performance characteristic such as pressure drop from its intended value.

In one aspect the invention provides apparatus for forming fibrous filter elements, which comprises:

(a) a reservoir for a body of aqueous liquid, said reservoir being provided with a first liquid level sensor;

(b) means for supplying make-up water to the reservoir via an inlet valve;

(c) a mixer for mixing fibers with liquid from the reservoir to form a slurry, the mixer comprising a tank provided with a second liquid level sensor;

(d) a holding tank for receiving slurry from the mixer and provided with a third liquid level sensor;

(e) at least one molding rig for molding fibrous filter elements from the slurry by separation of the fibers from a major proportion of the aqueous liquid of said slurry;

(f) means for supplying slurry from the holding tank under pressure to the or each molding rig;

(g) means for returning unused slurry from the or each molding rig to the holding tank;

(h) means for returning to the reservoir from the or each molding rig aqueous liquid that separates from the fibers as fibrous elements are molded; and (i) control means arranged to monitor the volume of liquid in said apparatus on the basis of received signals from said liquid level sensors, and if said total is below a target value to open the inlet valve for admission of make-up water to the reservoir.

In the above apparatus, in order to reduce changes in the composition of the aqueous liquid being fed to the mixer, control means may be arranged at each opening of the inlet valve during normal operation of the apparatus to admit a volume of water that is less than 50% of the volume of aqueous liquid already in the reservoir, and preferably less than 20% of the volume of aqueous liquid already in the reservoir. Abrupt changes in the composition of the aqueous liquid in the mixing tank may be further reduced by providing a mixing tank that has a working volume at least twice that of the holding tank, the mixing tank then being operable batchwise with each batch in the mixing tank comprising about 50% by volume of previously mixed slurry, the remainder being added fibers and aqueous liquid from the reservoir tank.

Accurate control of the pH of the slurry is important e.g. in the case of borosilicate fiber slurries which are unstable and flocculate outside a narrow pH range and are also susceptible to damage by acid. Such control may be achieved by providing a pH sensor for immersion in aqueous liquid in the mixing tank, and pH control means for monitoring the pH of the aqueous liquid in said mixing tank on the basis of received signals from said pH sensor, the arrangement being such that when said pH is outside a range of target values the control means operates acid or base supply means to add acid or base to the molding tank to adjust of the pH of the aqueous liquid therein. Further control of the consistency of the slurry may be achieved by providing a turbidity sensor for monitoring the consistency and aggregation of fiber slurry in the mixing tank, the microfibres of a batch being mixed to a constant turbidity before the resulting slurry is supplied to the holding tank, and the display of a steady as opposed to a varying turbidity providing an indication that mixing has been completed and that flocculated aggregates of fibers are not present in the slurry. Without real-time optical sensing of the consistency of the mix, it has been impossible for an operator to be certain that mixing has been completed and that the mix does not contain fiber aggregates.

The means for supplying slurry from the holding tank under pressure to the or each molding rig may comprise a pump in a conduit leading from said holding tank to said rig. The or each molding rig may include means defining a molding space between a central core and a cylindrical screen spaced from and outward of said core, and means defining a boundary for the molding space so that a mass of fibers becomes compacted on the screen and liquid is discharged from the molding space through the screen. Advantageously the or each rig further comprises a cylindrical sleeve in sliding contact with the cylindrical screen and drive means for moving the sleeve upwardly from a position substantially covering the screen as molding progresses whereby the height of the effective open area of the cylindrical screen progressively increases during molding. For best properties in the finished filter tube, the drive means may be arranged to move the screen upwardly at a rate substantially equal to the rate at which the height of the mass of fibers increases above the support.

The invention also includes the use of the apparatus described above for molding tubular filter elements e.g. of borosilicate microfibres, in which case the slurry used for molding should have a pH of 2.9±0.1.

In a further aspect, the invention is based on the realization that real time monitoring of slurry consistency is needed for adequate and traceable process control.

The invention further provides apparatus for forming fibrous filter elements, which comprises:

(a) a reservoir for a body of aqueous liquid;

(b) means for supplying make-up water to the reservoir;

(c) a mixer for mixing fibers with liquid from the reservoir to form a slurry, the mixer comprising a tank that provides a mixing space for fibers and a body of aqueous liquid;

(d) a holding tank for receiving slurry from the mixer;

(e) at least one molding rig for molding fibrous filter elements from the slurry by separation of the fibers from a major proportion of the aqueous liquid of said slurry;

(f) means for supplying slurry from the holding tank under pressure to the or each molding rig;

(g) means for returning unused slurry from the or each molding rig to the holding tank;

(h) means for returning to the reservoir from the or each molding rig aqueous liquid that separates from the fibers as fibrous elements are molded; and (i) a turbidity sensor fitted to the mixing tank for immersion in the aqueous liquid and for providing a signal indicating the consistency and degree of aggregation of the fibers in a batch of slurry being mixed.

The invention further provides a method for forming a tubular filter element, which includes the steps of:

(a) dispersing fibers in a liquid to form a slurry;

(b) introducing the slurry under pressure into a molding space defined between a central core, a cylindrical screen spaced from and outward of said core and means defining a boundary for the molding space so that a mass of fibers becomes compacted on the screen and liquid is discharged from the molding space through the screen; and (c) removing the resulting tubular mass of fibers from the molding space;

wherein dispersion of the fibers to form slurry having a predetermined consistency and free of aggregates is verified on the basis of a signal from a turbidity sensor.

In a yet further aspect, the invention is based on the realization that real time monitoring of slurry pH is needed for adequate and traceable process control.

The invention also provides apparatus for forming fibrous filter elements, which comprises:

(a) a reservoir for a body of aqueous liquid;

(b) means for supplying make-up water to the reservoir;

(c) a mixer for mixing fibers with liquid from the reservoir to form a slurry, the mixer comprising a tank that provides a mixing space for fibers and a body of aqueous liquid;

(d) a holding tank for receiving slurry from the mixer;

(e) at least one molding rig for molding fibrous filter elements from the slurry by separation of the fibers from a major proportion of the aqueous liquid of said slurry;

(f) means for supplying slurry from the holding tank under pressure to the or each molding rig;

(g) means for returning unused slurry from the or each molding rig to the holding tank;

(h) means for returning to the reservoir from the or each molding rig aqueous liquid that separates from the fibers as fibrous elements are molded; and (i) a pH controller comprising a sensor for immersion in aqueous liquid in the mixing tank, pH control means for monitoring the pH of the aqueous liquid in said mixing tank on the basis of received signals from said pH sensor, and acid or base supply means for operation by said control means when said pH is outside a range of target values to add acid or base to the aqueous liquid in the mixing tank for adjustment of the pH of said aqueous liquid.

The invention further provides a method for forming a tubular filter element, which includes the steps of:

(a) dispersing fibers in a liquid to form a slurry;

(b) introducing the slurry under pressure into a molding space defined between a central core, a cylindrical screen spaced from and outward of said core and means defining a boundary for the molding space so that a mass of fibers becomes compacted on the screen and liquid is discharged from the molding space through the screen; and (c) removing the resulting tubular mass of fibers from the molding space, wherein:

(d) the fibers are dispersed in liquid in a main mixing tank provided with a pH sensor submerged in the liquid in the tank for providing a signal to acidity adjustment means arranged to supply acid or alkali to liquid in said main mixing tank to maintain the pH of liquid within said tank within a predetermined range of values; and (e) the dispersed fibers are fed from the main mixing tank to a slave tank for supply to the molding space.

BRIEF DESCRIPTION OF THE DRAWINGS

An embodiment of the invention will now be described, by way of example only, with reference to the accompanying drawings, in which:

FIG. 3 is a simplified diagram of a control system for monitoring the volume of aqueous liquid in the plant and for controlling addition of make-up water as required.

DETAILED DESCRIPTION OF PREFERRED EMBODIMENTS

Figure 1:
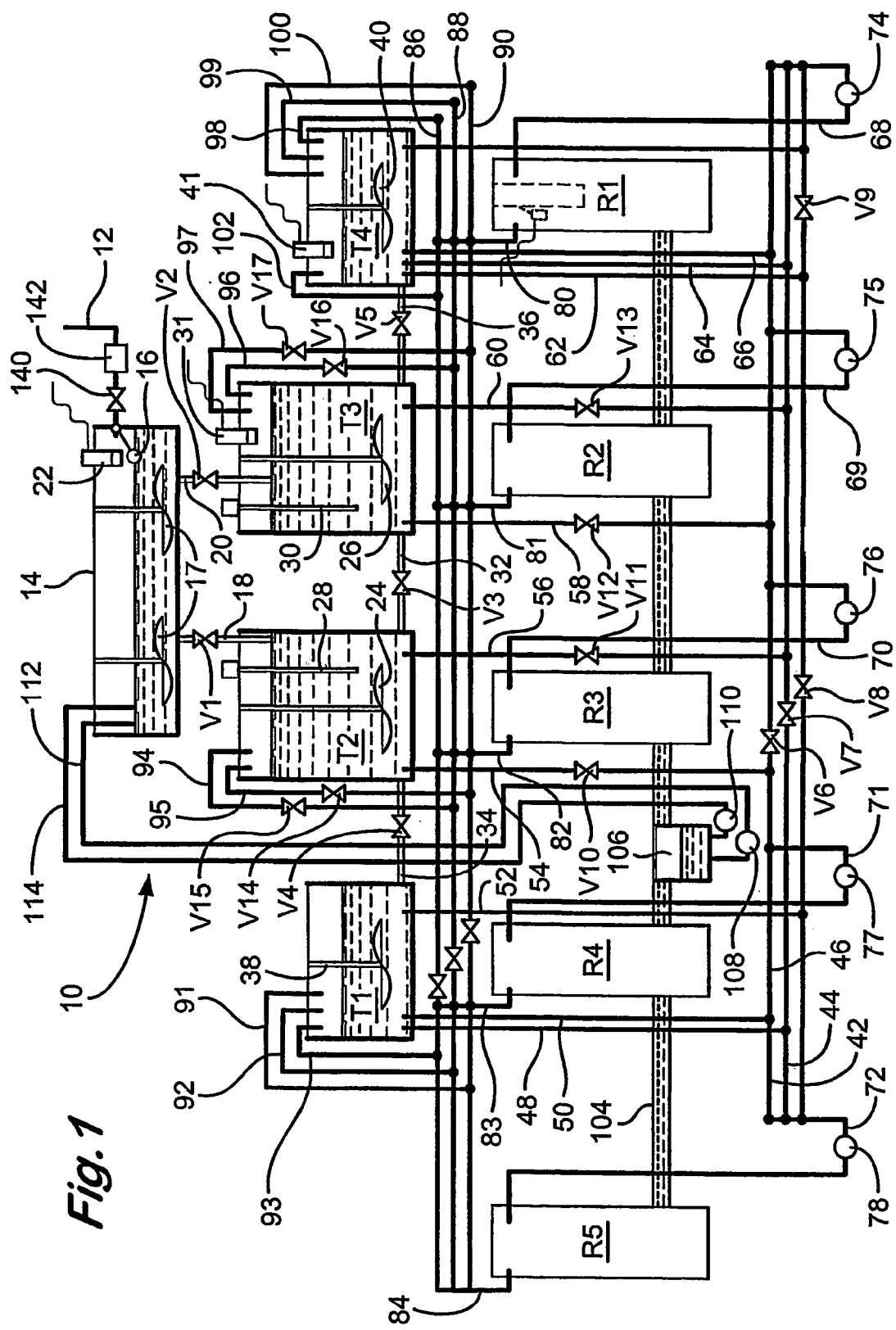
FIG. 1 is a simplified schematic diagram of a plant for molding tubular filter elements from microfibres.

FIG. 1 is a diagram of a molding plant generally indicated by the reference numeral 10 for molding tubular filter elements, preferably but not exclusively using the molding method described in U.S. Pat. No. 4,303,472 discussed above. It shows in particular a system for mixing a slurry of borosilicate glass fibers, supplying the slurry to a plurality of molding rigs, and recovering water discharged during the molding process.

Make-up water from a supply line 12 is fed to a reservoir tank 14 via an overflow-preventing valve 16 for preventing the water in tank 14 from rising above a predetermined level, and is stirred by impellers 17. As will become apparent, in steady-state operation the make-up water mixes with liquid recovered from previous molding operations, which is acidic so that the recovered liquid is a significant and usually the major component of the liquid present in the reservoir tank 14. First and second discharge pipes 18, 20 lead from the reservoir tank to the main mixing tanks T2 and T3, and flow into those tanks is controlled by respective control valves V1 and V2. Liquid level in the reservoir tank 14 is sensed by an ultrasonic level sensor 22 for providing a signal to a control system indicating the volume of liquid present in the tank. When a batch of slurry is mixed in one or other of the main mixing tanks T2 and T3 and consequently the level in holding tank 14 falls towards a pre-determined minimum level, tank 14 is re-filled gradually to a predetermined maximum level. It is desirable to avoid a sudden influx of large volume of mains water which in the UK is typically at pH 7 or 8 and could cause the pH of the slurry mixed in tanks T2 and T3 to deviate unavoidably from its intended range.

As previously stated, mixing of the borosilicate glass fibers with water and with acid takes place batchwise in the tanks T2 and T3, and addition of these materials may be carried out manually or using mechanical feed devices (not shown). The contents of the tanks are stirred by impellers 24, 26. The pH of the fiber dispersion present is monitored by pH sensors 28, 30 for providing signals to a pH controller and the liquid level in each tank is determined by an ultrasonic level sensor 31, 31a (only that for T3 is shown in FIG. 1), again for providing signals to the control system representing the volume of dispersion present in tanks T2 and T3. All sensor information can be displayed in real time e.g. on a display screen of a computer forming part of a control system to be described below. Transfer of liquid between tanks T2 and T3 can be carried out via valve V3 in connecting line 32. Slurry can also be fed from tanks T2 and T3 to slave tanks T1 and T4 via respective connecting lines 34, 36 and control valves V4 and V5. As molding progresses and slurry becomes consumed, fresh batches of slurry are mixed in tanks T2 and T3 and after mixing has been completed, the slurry is supplied to slave tanks T1 and T4 from which it is made available to rigs R1-R5. The contents of the slave tanks are stirred by respective impellers 38, 40 and the liquid levels in them are determined by respective ultrasonic level sensors 41, 41a (only that for T4 is shown in FIG. 1), again for providing to the control system signals indicating the volume of liquid present in tanks T1 and T4.

Slurry flows from the tanks T1 and T4 (and optionally but not normally from tanks T2 and T3) to slurry supply manifold lines 42, 44 and 46. Tank T1 is connected to lines 42, 44, 46 by normally open respective feed lines 48, 50, 52, tank T2 is connected to lines 42 and 44 by normally closed respective feed lines 54, 56 (the valves V10 and V11 being normally shut), tank T3 is also connected to lines 42, 44 by respective feed lines 58, 60 with normally shut valves V12 and V13 and tank T4 is connected to lines 42, 44, 46 by respective feed lines 62, 64, 66. Depending upon the pattern of use of the molding rigs, parts of the manifold lines 42-46 may be shut off by isolation valves V6-V9.

In the installation illustrated, five molding rigs R1-R5 are supplied with slurry from slave tanks T1 and T4. The molding rigs may incorporate a sliding sleeve that rises as the molding operation progresses as described with reference to FIGS. 5 and 6 of U.S. Pat. No. 4,303,472. It will be appreciated that the number of rigs can be increased or decreased depending on the production required. Slurry is delivered at a pressure of about 414-689 mb (6-10 p.s.i.) to respective rigs from the manifold lines 42-46 via supply lines 68, 69, 70, 71 and 72 and pumps 74, 75, 76, 77 and 78. The pumps operate continuously and slurry which is not drawn off by the rigs for molding passes via return lines 80, 81, 82, 83, 84 to slurry recovery manifold lines 86, 88, 90. Slurry returns from the manifold lines 86, 88, 90 via return lines 91, 92, 93 to tank T1, if necessary from manifold lines

88, 90 via return lines 94, 95 to T2 (the valves V14 and V15 normally being normally shut), if necessary from manifold lines 88, 90 via return lines 96, 97 (the valves V16 and V17 being normally closed) to T3, and from manifold lines 86, 88, 90 via return lines 98, 99, 100, 102 to T4.

Liquid discharged from the molding process is substantially fiber-free water that has been acidified to the pH needed to stabilize the borosilicate fibers in dispersion, and also needs to be recovered. For that purpose, a common drain 104 is provided for collecting the discharged liquid from rigs R1-R5. The liquid flows to holding tank 106, from which it is pumped by pumps 108, 110 and return lines 112, 114 to the reservoir tank 14. The steady-state contents of tank 14 will therefore be recovered liquid from the molding process, with additional water from inlet line 12 as needed.

Stability of fiber dispersions can be pH dependent. In the case of borosilicate microfibres, for example, we have found that the pH needs to be maintained at a pH of 2.9±0.1, otherwise the fibers form clumps which make molding more difficult and reduce the performance of the resulting filter. Although U.S. Pat. No. 4,272,318 mentions that acid should be added to bring the pH to a value within the range 2.8-3.5 in order that the fibers should disperse more readily, the problem of dispersion stability and avoidance of flocculation and of the development of fiber clumps is not disclosed. Furthermore, when an error in pH is noted there has in the past been a problem of over-correction, especially when making up the liquid in the main mixing tank or tanks with mains water which as mentioned above is alkaline. This problem has been solved by:

(a) Controlling the level in the reservoir tank 14 in real time on the basis of a predetermined total volume of water so that re-filling with make-up mains water, which at least in the UK is alkaline (pH 7-8), is gradual and a sudden influx of a large volume of mains water is avoided. In this way sudden changes in the pH of the aqueous liquid that is added to the mixing tanks T2 and T3 to make up successive batches of fiber slurry is avoided, and the pH control system for each mixing tank (described below) does not have to deal with sudden influx of a large volume of aqueous liquid whose pH deviates widely from the target value, and the likelihood of over-shoot by the pH control system is avoided. Flocculation of the fiber dispersion by drift of the pH outside the target range and fiber damage resulting from excursions of pH value significantly below 2.8 is avoided.

(b) Providing an optical system for real-time monitoring of the consistency of the fiber mix. Without such an optical system it is more difficult and time consuming to check that the fiber mix has the correct consistency and, even more significantly, it has been difficult to check for fiber clumping or flocculation which shows up as time-dependent changes in the observed mix consistency. An operator can check that the mix has the correct consistency and that the fibers are correctly dispersed before the mixed slurry is allowed to pass into the slave tanks T1 and T4 for delivery to rigs R1-R5. Although avoidance of sudden changes in the pH of the aqueous liquid supplied to the mixing tanks, real-time pH control in the mixing tanks and real-time consistency monitoring may at first sight appear unrelated, they can be used in combination to address the problem of fiber flocculation.

Figure 2:
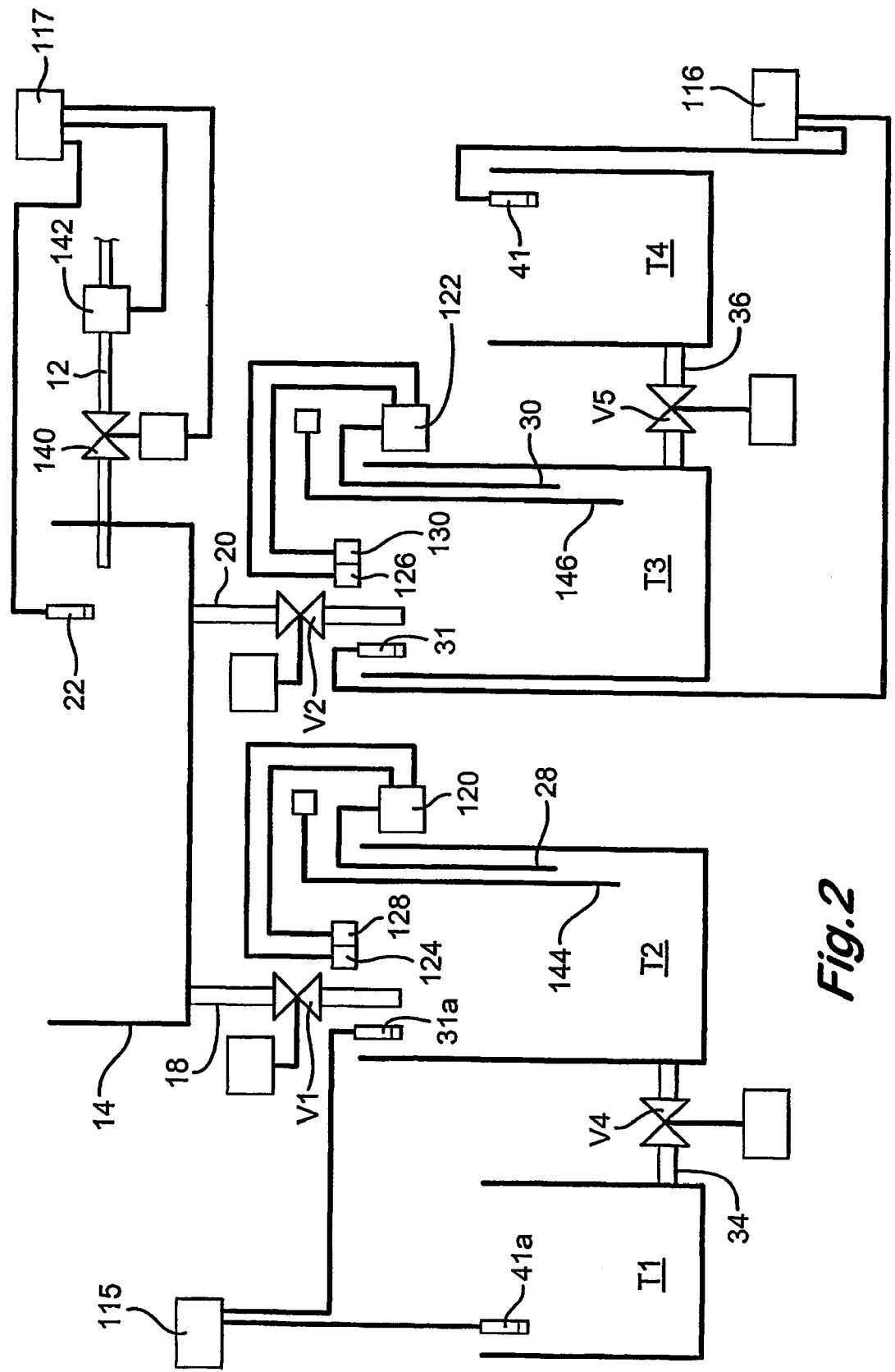
FIG. 2 is a schematic diagram of a feed water holding tank, main mixing tanks and slave tanks forming part of a slurry supply system for the plant of FIG. 1 and showing elements of associated pH and slurry consistency control systems.

Referring to FIG. 2, level sensors 41*a*, 31*a* provide signals to level control unit 115, level sensors 31 and 41 provide signals to level control unit 116 and level sensor 22 provides signals to level control unit 117, all forming in practice part of a common level control system. As shown in FIG. 3, the signals are fed to controller 118 which calculates the volume of aqueous liquid in each tank on the basis of the received level control signals and sums them to calculate the total volume of aqueous liquid in the molding rig. The resulting total $V_M$ is compared with a pre-set target value $V_T$ by comparator 119, and if $V_M < V_T$ then valve 140 in make-up water feed line 12 is opened to fill the reservoir tank. A flow meter 142 in line 12 provides a signal to the control unit 118 to provide a check on the volume of make-up water being added. As explained above, the control unit 118 is arranged so that large excursions of $V_M$ below $V_T$ are avoided and correspondingly the volume of water added to the reservoir tank 14 at each occasion is small relative to the volume of aqueous liquid already in the reservoir. It will be appreciated that for further reduction in the range of pH values of the aqueous liquid being supplied to the mixing tanks T2 and T3, another pH controller may be provided for real time Ph monitoring of the liquid in reservoir tank 14 and addition of acid or base as appropriate to maintain the pH within that tank to within a range of predetermined target values.

pH sensors 28, 30 for tanks T2 and T3 provide signals to pH controllers 120, 122 and if the pH of the aqueous liquid falls outside the target range, then peristaltic pumps 124, 126 can be operated to add acid or peristaltic pumps 128, 130 can be operated to add alkali as required to adjust the pH appropriately. The pumps 124, 126 feed relatively strong acid, for example 55% sulfuric acid and 45% water, and the pumps 128, 130 feed relatively strong base, for example 40% sodium hydroxide in 60% water. The use of peristaltic pumps is preferred; other types of pump which can be driven to dispense controlled volumes of acid or alkali can also be used. The pH controllers 120,122 will also form part of the computer control system 118 (FIG. 3) for the rig.

Optical particle sensors 144, 146 submerged in the aqueous liquid in tanks T2 and T3 provide real time information about the consistency (fiber concentration in grams/liter) of the aqueous liquid in the mixing tanks T2 and T3. Optical sensors are known for use in the measurement of suspended particle concentrations in water and other fluids, and rely on measurement of the turbidity of the fluid. Forward scattering sensors measure light scattered at angles between 0° and 90°, nephelometers which measure light scattered at about 90° and back-scattering sensors that measure light scattered at angles from 90° to 180° can be used. We have found that a turbidity sensor made by Polymetron, a division of Zellweger Analytics, product number RD260 is suitable and may be positioned in a high flow region of the mixing tanks where the likelihood of blinding by deposition of the borosilicate fibers is reduced. By way of background, U.S. Pat. No. 4,641,969 discloses a method for measuring the concentration of suspended particles in a flowing medium such as paper stock by directing a beam of light from a source into the medium, intercepting directly reflected light to produce a first signal, intercepting multiply reflected light to produce a second signal and producing a concentration level signal which is a ratio of the first and second signals and is independent of disturbing factors such as pulp color. U.S. Pat. No. 4,986,660 discloses the use of light reflected from suspended particles to determine the amount of particles suspended in paper stock, different species of trees or other fiber sources giving rise to fibers of different length and diameter and causing errors in measurement. U.S. Pat. No. 5,350,922 discloses a light scattering sensor for measuring suspended particle concentrations in natural waters. We are not aware of any disclosure or suggestion of the use of turbidity sensors to monitor the quality and completeness of fiber dispersion. Measurement of suspended solids by turbidity sensing which is automatic may be calibrated from time to time using previously known manual procedures e.g. extracting a sample of known volume, filtering off the fiber content and drying and weighing it.

Each filter molded using the above process and apparatus may carry a code stamp showing the batch that it was molded from, and this enables application or in-house end test performance to be checked against mix conditions.

Various changes may be made to the embodiment described above without departing from the invention. For example, although it is less preferred, the reservoir tank 14 could be used for mixing the fibers and aqueous liquid, and the resulting slurry could be used to feed a slave tank for molding. To do this, fresh water could to be added to the reservoir tank 14 in reasonable volumes e.g. $\leq 25\%$, the resulting mix could be made over-concentrated and then filuted for use with additional water in the slave or final mixing tank. For example apparatus for forming fibrous filter elements could comprise (a) a reservoir 14 for a body of aqueous liquid, said reservoir being provided with a first liquid level sensor 22 and means 17 being provided for mixing said body of aqueous liquid with fibers to form a slurry;

(b) means 12 for supplying make-up water to the reservoir via an inlet valve 140;

(c) a mixer T3 for mixing liquid from the reservoir with further water, the mixer comprising a tank provided with a second liquid level sensor 31;

(d) at least one molding rig R1 for molding fibrous filter elements from the slurry by separation of the fibers from a major proportion of the aqueous liquid of said slurry;

(e) means 58, 60, 74 for supplying slurry from the mixer T3 under pressure to the or each molding rig;

(f) means 80, 96, 97 for returning unused slurry from the or each molding rig to the mixer;

(g) means 112, 114 for returning to the reservoir from the or each molding rig aqueous liquid that separates from the fibers as fibrous elements are molded; and (h) control means arranged to monitor the volume of liquid in said apparatus on the basis of received signals from said liquid level sensors, and if said total is below a target value to open the inlet valve for admission of make-up water to the reservoir.

The fibers that can be molded according to the invention are not limited to borosilicate glass mocrofibers, and could include polyester fibers, polyamide fibers, or other synthetic fibers or mixtures of borosilicate or other glass fibeers with synthetic fibers. Molding of other shapes than cylindrical elements is possible, for example planar filter elements, frustoconical filter elements or filter elements of arbitrary shape, subject to the availablility of appropriate tooling.

The invention claimed is:

1. Apparatus for forming fibrous filter elements, which comprises:
    a reservoir for a body of aqueous liquid, said reservoir being provided with a first liquid level sensor to output a first sensor signal;
    means for supplying make-up water to the reservoir via an inlet valve;
    a mixer for mixing fibers with liquid from the reservoir to form a slurry, the mixer comprising a tank provided with a second liquid level sensor to output a second sensor signal;
    a holding tank for receiving slurry from the mixer and provided with a third liquid level sensor to output a third sensor signal;
    at least one molding rig for molding fibrous filter elements from the slurry by separation of the fibers from a major proportion of the aqueous liquid of said slurry;
    means for supplying slurry from the holding tank under pressure to the or each molding rig;
    means for returning unused slurry from the or each molding rig to the holding tank;
    means for returning to the reservoir from the or each molding rig aqueous liquid that separates from the fibers as fibrous elements are molded; and
    control means arranged to monitor the volume of liquid in said apparatus on the basis of received first, second and third signals from said first, second and third liquid level sensors, and the control means, if the volume of liquid is below a target value and aqueous liquid returning to the reservoir being insufficient to maintain the volume of liquid in the apparatus above a target value, to open the inlet valve for admission of make-up water to the reservoir.

2. The apparatus of claim 1, wherein the control means is arranged at each opening of the inlet valve during normal operation of the apparatus to admit a volume of water that is less than 50% of the volume of aqueous liquid already in the reservoir.

3. The apparatus of claim 1, wherein the control means is arranged at each opening of the inlet valve during normal operation of the apparatus to admit a volume of water that is less than 20% of the volume of aqueous liquid already in the reservoir.

4. The apparatus of claim 1, wherein the mixing tank has a working volume at least twice that of the holding tank.

5. The apparatus of claim 1, further comprising a pH sensor for immersion in aqueous liquid in the mixing tank, and pH control means for monitoring the pH of the aqueous liquid in said mixing tank on the basis of received signals from said pH sensor, and when said pH is outside a range of target values for operating acid or base supply means to add acid or base to the holding tank to adjust of the pH of the aqueous liquid therein.

6. The apparatus of claim 1, further comprising a turbidity sensor for monitoring the consistency and aggregation of fiber slurry in the mixing tank.

7. The apparatus of claim 1, wherein said means for supplying slurry from the holding tank under pressure to the or each molding rig comprises a pump in a conduit leading from said holding tank to said rig.

8. The apparatus of claim 1, wherein the or each molding rig includes means defining a molding space between a central core and a cylindrical screen spaced from and outward of said core, and means defining a boundary for the molding space so that a mass of fibers becomes compacted on the screen and liquid is discharged from the molding space through the screen.

9. The apparatus of claim 8, wherein the or each rig further comprises a cylindrical sleeve in sliding contact with the cylindrical screen and drive means for moving the sleeve upwardly from a position substantially covering the screen as molding progresses whereby the height of the effective open area of the cylindrical screen progressively increases during molding.

10. The apparatus of claim 9, wherein the drive means is arranged to move the screen upwardly at a rate substantially equal to the rate at which the height of the mass of fibers increases above the support.

11. Apparatus for forming fibrous filter elements, comprising:

a reservoir for a body of aqueous liquid, said reservoir including a first liquid level sensor to provide a first signal and an inlet valve to supply make-up fluid;

a mixer to mix fibers with liquid from the reservoir to form a slurry, the mixer comprising a tank including a second liquid level sensor to provide a second signal;

a holding tank to receive slurry from the mixer, the holding tank including a third liquid level sensor to provide a third signal;

at least one molding rig for molding fibrous filter elements from the slurry by separation of the fibers from a major proportion of the aqueous liquid of said slurry;

a slurry supply connecting the holding tank under pressure to the molding rig;

an unused slurry return connected to the molding rig and the holding tank;

an aqueous liquid return connected to the molding rig and the reservoir; and a controller to monitor a liquid level on a basis of received signals from the first liquid level sensor, the second liquid level sensor, and the third liquid level sensor, the controller to determine whether a total amount of liquid is below a target value and to selectively open the inlet valve for admission of make-up water to the reservoir with returned liquid from the molding rig being insufficient to maintain liquid in the reservoir above a minimum level.

12. The apparatus of claim 11, wherein the controller is to control the inlet valve during normal operation to admit a volume of water that is less than 50% of the volume of aqueous liquid already in the reservoir.

13. The apparatus of claim 11, wherein the controller is to control the inlet valve during normal operation to admit a volume of water that is less than 20% of the volume of aqueous liquid already in the reservoir.

14. The apparatus of claim 13, wherein the mixing tank has a working volume at least twice a working volume of the holding tank.

15. The apparatus of claim 11, wherein the mixing tank includes a pH sensor, and wherein the controller is to monitor the pH of the aqueous liquid in the mixing tank on the basis of received signals from the pH sensor, and when the pH is outside a range of target values for operating acidic or basic value, then the controller operates a supply to add acid or base to the holding tank to adjust of the pH of the aqueous liquid therein.

* * * * *